US011366241B2

(12) United States Patent
Alshuhail et al.

(10) Patent No.: US 11,366,241 B2
(45) Date of Patent: Jun. 21, 2022

(54) SPATIALLY ADAPTIVE VIBRATOR SWEEP PARAMETER SELECTION DURING SEISMIC DATA ACQUISITION

(71) Applicant: Saudi Arabian Oil Company, Dhahran (SA)

(72) Inventors: Abdulrahman Alshuhail, Dhahran (SA); Constantinos Tsingas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 988 days.

(21) Appl. No.: 16/058,788

(22) Filed: Aug. 8, 2018

(65) Prior Publication Data
US 2020/0049842 A1   Feb. 13, 2020

(51) Int. Cl.
*G01V 1/36* (2006.01)
*G01V 1/00* (2006.01)
*G01V 1/32* (2006.01)

(52) U.S. Cl.
CPC .............. *G01V 1/005* (2013.01); *G01V 1/325* (2013.01); *G01V 1/36* (2013.01); *G01V 2210/32* (2013.01)

(58) Field of Classification Search
CPC .......... G01V 1/005; G01V 1/325; G01V 1/36; G01V 2210/32
See application file for complete search history.

(56) References Cited

U.S. PATENT DOCUMENTS 9,069,091 B2 *  6/2015  Iranpour ................ G01V 1/005
9,322,941 B2 *  4/2016  Meunier ................ G01V 1/005
(Continued)

FOREIGN PATENT DOCUMENTS

EP          2624015         8/2013
EP     E P-2624015 A2 *     8/2013   ............. G01V 1/143
(Continued)

OTHER PUBLICATIONS

International Search Report and Written Opinion issued in International Application No. PCT/US2019/045409 dated Oct. 31, 2019, 15 pages.
(Continued)

*Primary Examiner* — Krystine E Breier
(74) *Attorney, Agent, or Firm* — Fish & Richardson P.C.

(57) ABSTRACT

A computer-implemented method includes the following. A frequency sweep using sweep parameters is emitted from a vibratory seismic source into geological layers. The sweep parameters include frequencies and modulation parameters for seismic waves. Signals are received from one or more sensors. The signals include seismic data acquisition information, including values identifying energy reflected back from boundaries where rock properties change. A determination is made regarding which of the reflected seismic waves are attenuated. The determination uses an integral transform and a thresholding algorithm for image segmentation. Optimum sweep parameters are determined based on the reflected seismic values that are attenuated and updated to compensate for local geology effects. The emitting, receiving, determining attenuation, determining optimum parameters, and updating are repeated until the received signals are determined to be satisfactory.

20 Claims, 12 Drawing Sheets

(56) References Cited

U.S. PATENT DOCUMENTS

| 10,996,356 B2* | 5/2021 | Orji ............................ G01V 1/04 |
| 2008/0137476 A1* | 6/2008 | Eick ........................ G01V 1/005 |
| | | 367/38 |
| 2014/0043937 A1* | 2/2014 | Teyssandier ......... G01V 1/3808 |
| | | 367/23 |

FOREIGN PATENT DOCUMENTS

| EP | 3264142 | 1/2018 |
| WO | 2014134432 | 9/2014 |
| WO | 2015097557 | 7/2015 |

OTHER PUBLICATIONS

GCC Examination Report in GCC Appln. No. GC 2019-38071, dated Sep. 2, 2020, 4 pages.
Meunier, "Seismic acquisition from yesterday to tomorrow," Society of Exploration Geophysicists, No. 14, 2011, 3 pages.
GCC Examination Report in GCC Appln. No. GC 2019-38071, dated Apr. 5, 2021, 5 pages.

\* cited by examiner

SPATIALLY ADAPTIVE VIBRATOR SWEEP PARAMETER SELECTION DURING SEISMIC DATA ACQUISITION

BACKGROUND

The present disclosure relates to land and marine seismic vibratory acquisition operations. In conventional systems, limitations can include acquisition delays due to data transmission and real-time analysis. Further, the effects of local geological conditions can have an effect on the quality of information that is determined during acquisition.

SUMMARY

The present disclosure describes techniques that can be used for incrementally adapting sweep parameters, based on local geological conditions, for seismic data acquisition. For example, the techniques can be used to design an optimum pilot sweep according to spatially-distributed recorded signal, which can better compensate for surface and subsurface geologic variations in a particular area. The techniques can be used to update source vibratory parameters in real time to assure that an optimum and high signal-to-noise ratio is recorded for a broadband signal. Source parameters for seismic vibrators can include, for example, a sweep duration, a total time for all sweeps, a sweep start time, a sweep stop time, a sweep start frequency, a sweep stop frequency, a sweep as a function of amplitude and time, a sweep phase encoding, a vibrator hold down force, a number of sweep segments, pre- and post-sweep tapers and duration, and a sweep listen time between sweeps.

A computer-implemented method includes the following. A frequency sweep using sweep parameters is emitted from a vibratory seismic source into geological layers. The sweep parameters include frequencies and modulation parameters for seismic waves. Signals are received from one or more sensors. The signals include seismic data acquisition information, including values identifying energy reflected back from boundaries where rock properties change. A determination is made regarding which of the reflected seismic waves are attenuated. The determination uses an integral transform and a thresholding algorithm for image segmentation. Optimum sweep parameters are determined based on the reflected seismic values that are attenuated and updated to compensate for local geology effects. The receiving, determining attenuation, determining optimum parameters, and updating are repeated until the received signals are determined to be satisfactory.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, techniques described in the present disclosure can enable better signal-to-noise ratios of recorded data to compensate for the absorption of the geology. Second, optimum and variable source parameters can be based on (and improved using seismic information from) a specific location having unique geology. This can provide better results than conventional systems that provide a single set of parameters that are chosen at the beginning of the acquisition survey and optionally adjusted a single time. Third, the techniques can assure an optimized and spatially-adjusted broadband source signal versus commercially available alternatives.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for incrementally adapting sweep parameters, based on local geological conditions, for seismic data acquisition. For example, at a high level, signals received from a sweep can be analyzed at a receiver side. Limits where there is sufficient signal-to-noise ratio are identified. A signal-to-noise ratio can be considered to be "sufficient" if, for example, the ratio between a level of a desired signal to a level of background noise is a above a pre-determined value or threshold (for example, set by a user or an application). The information is used to change sweep parameters that are then provided to the vibratory source so that the new pilot sweep can be adjusted to assure a more optimum broadband sweep. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The present disclosure describes methods and processing related to seismic data acquisition and in field data processing. In seismic data acquisition, the emitted frequency sweep from a vibratory seismic source (land or marine) is reflected from the subsurface geologic layers and then recorded as a function of time by a predefined selection of sensors located on or beneath the surface of the Earth. This information is transmitted in real time (for example, within a period of time, such as within a few seconds or a few minutes) to the recording truck in the field. The recorded raw (pre-correlated) seismic signal is transformed by Fourier transform to its frequency domain representation. The Fourier transformed data illustrates the variation of recorded frequencies as a function of sweep time. Energy thresholding is then applied to identify which frequencies have sufficient signal-to-noise ratio for the specific spatially distributed selection of receivers to automatically adjust the sweep parameters. Therefore, a new optimized pilot sweep is designed according to the spatially recorded signal characteristics and sent to the vibratory source to continue acquisition.

Figure 1A:
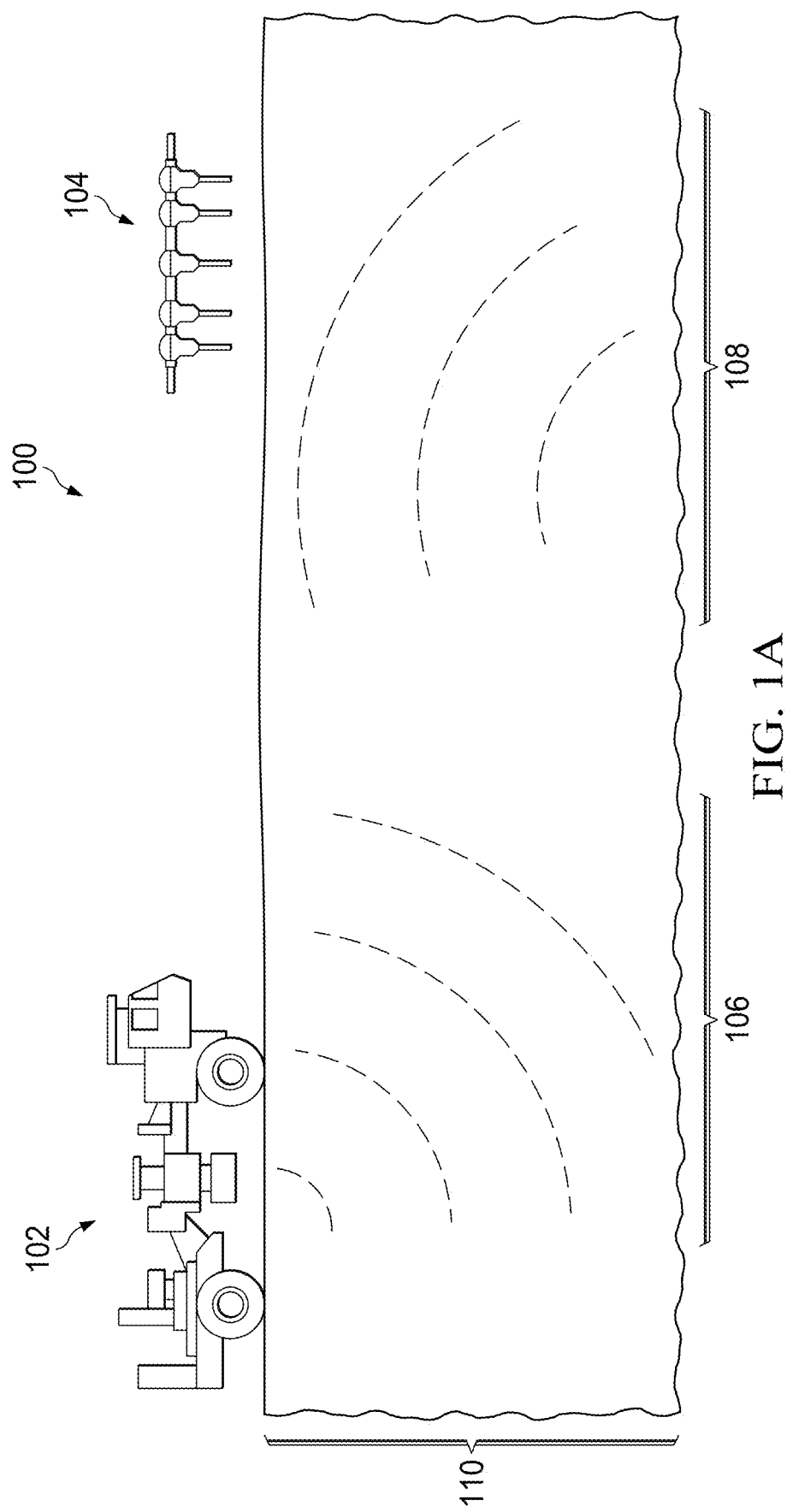
FIG. 1A is a diagram of an example of a land data acquisition operation, according to some implementations of the present disclosure.

FIG. 1A is a diagram of an example of a land data acquisition operation 100, according to some implementations of the present disclosure. The land data acquisition operation 100 can support seismic data acquisition using a vibratory source 102 and multiple receivers 104 that are deployed to acquire seismic waves. The vibratory source 102 can emit vibrations 106 during a frequency sweep (or a pilot sweep) for a limited amount of time, for example, for 12 to 16 seconds. The multiple receivers 104 can receive and record elastic waves 108 that have been reflected by the subsurface geologic layers 110. In some implementations, multiple vibratory sources 102 can be used for a same geological survey.

During the process in which vibrations 106 are emitted and elastic waves 108 are recorded, the Earth may act as a filter for seismic waves. Filtering can occur, for example, based on how the vibrations 106 are reflected or refracted due to different geological formations at different depths and locations. As a result, some of the frequency bands generated by the vibratory source 102 may not be recorded by the receivers 104. In some implementations, the effects of losing frequency bands during the process can be reduced by optimizing source sweep parameters. In some typical conventional systems, for example, a single pilot sweep may be chosen based on the local geology, overall terrain conditions, and manufacturer vibrator specifications. However, a single pilot sweep approach can be sub-optimal for use in an entire acquisition area because subsurface geology can vary by location.

Techniques described in the present disclosure can include methodologies that provide pilot sweeps that are spatially variable according to location-unique receiver signal characteristics. In some implementations, a set of receivers 104 that are deployed at predefined receiver locations can record the reflected signals (for example, elastic waves 108). The receivers 104 can acquire raw pre-correlated signals consisting of amplitude versus time. The raw pre-correlated signals can be sent to a recording truck (or some other local or remote system) where a transformation, such as a time-dependent Fourier transform, can be performed. In this domain, time frequency relationships among of the raw pre-correlated data can be determined. For example, amplitude thresholding can be applied to identify frequencies that have a sufficient signal-to-noise ratio. The analysis can be used to design a new pilot sweep, including the definition of updated sweep parameters that are to be used in the new sweep. The updated sweep parameters can be provided to the vibratory source 102.

Figure 1B:
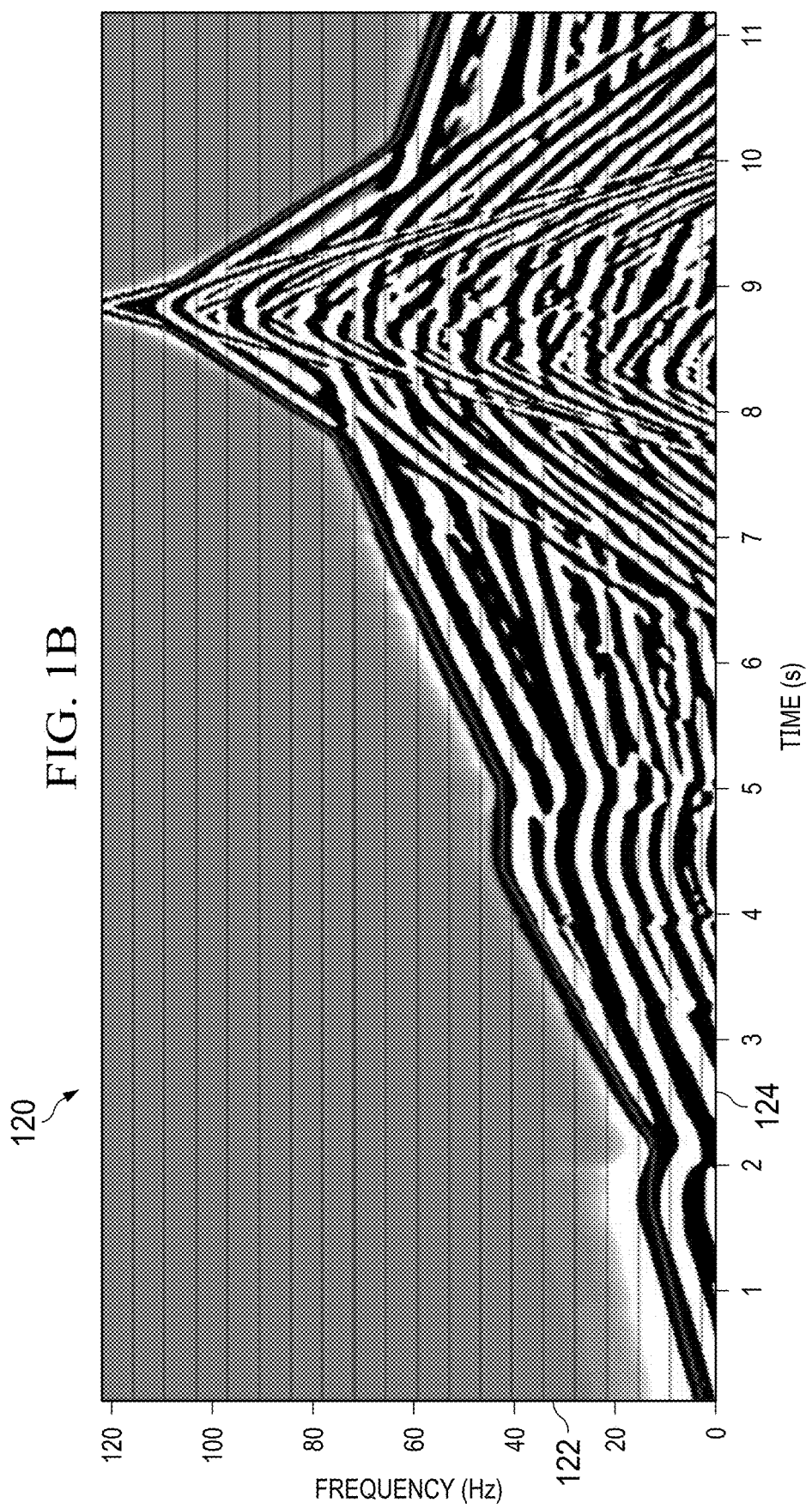
FIG. 1B is a diagram showing an example of a signal that includes a high signal-to-noise ratio, according to some implementations of the present disclosure.

FIG. 1B is a diagram showing an example of a signal 120 that includes a high signal-to-noise ratio, according to some implementations of the present disclosure. As shown in FIG. 1B, frequency values 122 of the signal 120 increase over time 124. A high signal-to-noise ratio makes it possible to infer information on the subsurface. In some implementations, a threshold of 24 dB, for example, can be used as a threshold at which a high signal-to-noise ratio can be achieved. The dB scale is a logarithmic scale of measurement used to express sound level.

Figure 1C:
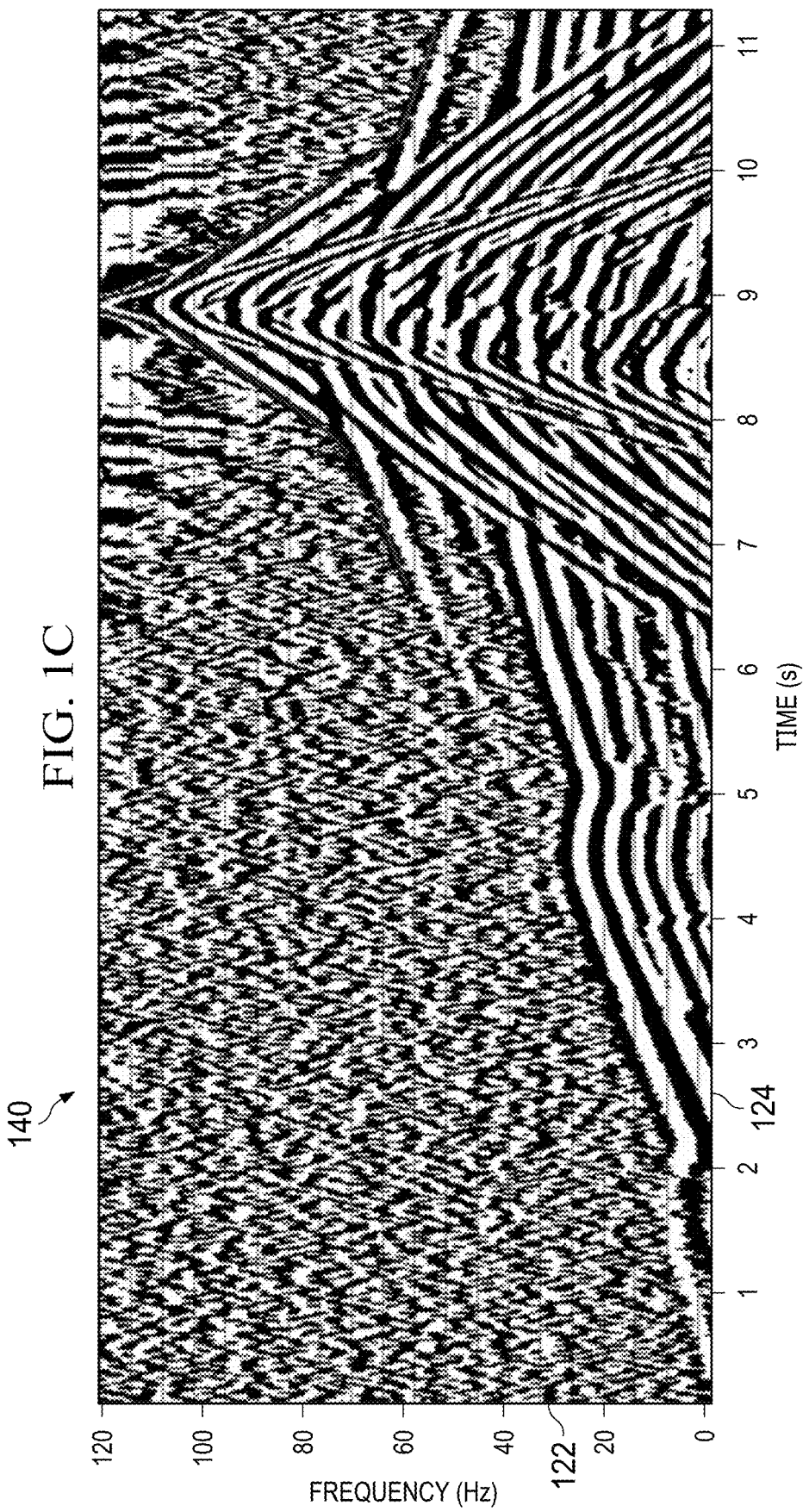
FIG. 1C is a diagram showing an example of a signal that includes a low signal-to-noise ratio, according to some implementations of the present disclosure.

FIG. 1C is a diagram showing an example of a signal 140 that includes a low signal-to-noise ratio, according to some implementations of the present disclosure. As shown in FIG. 1B, the signal 140 includes gray hashed (representing noise) that are not visible in the signal 120.

Figure 2:
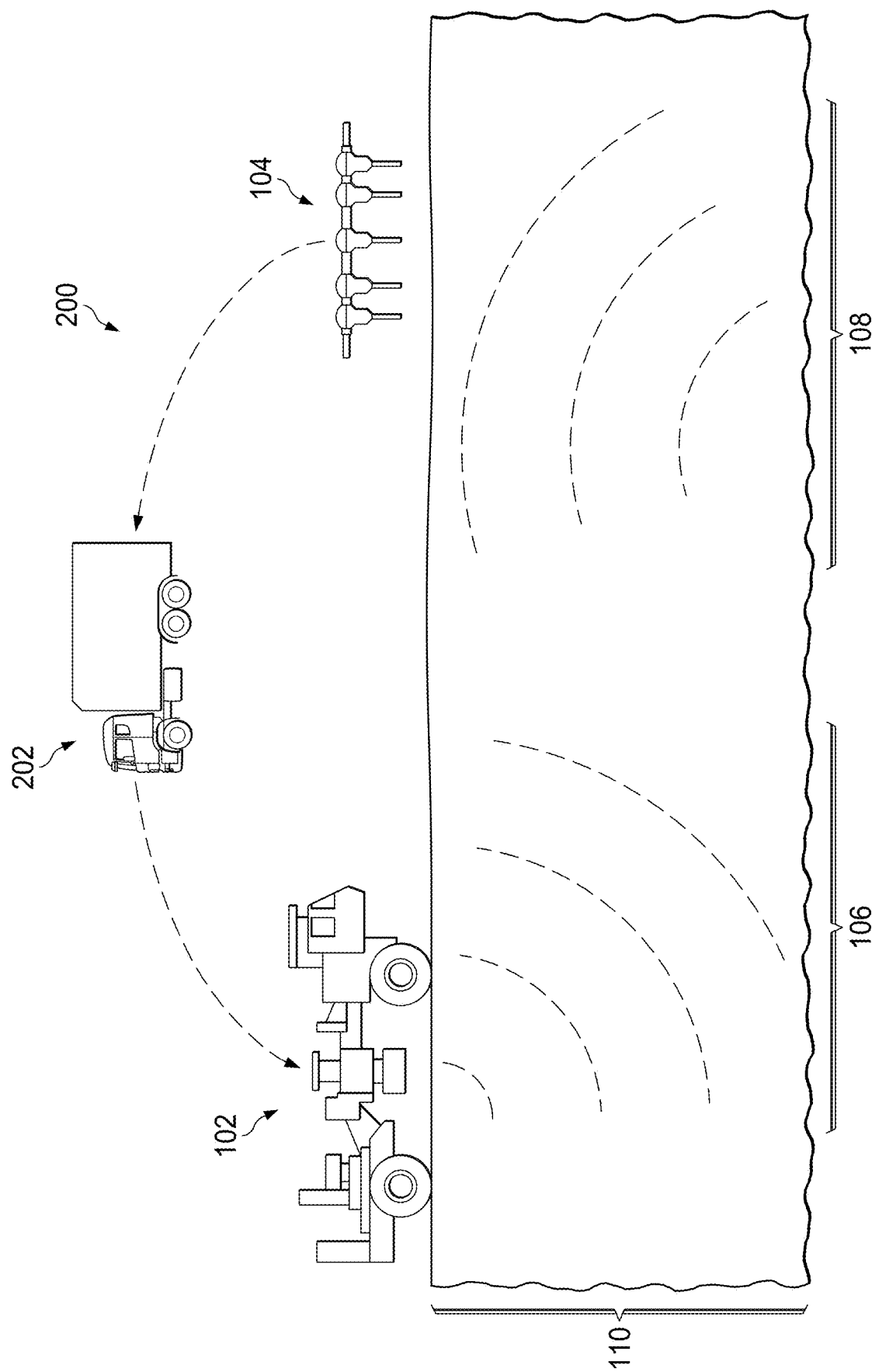
FIG. 2 is a diagram of an example of a land data acquisition operation that includes a frequency analyzer, according to some implementations of the present disclosure.

FIG. 2 is a diagram of an example of a land data acquisition operation 200 that includes a frequency analyzer 202, according to some implementations of the present disclosure. The land data acquisition operation 200 is an improvement over the land data acquisition operation 100 because the frequency analyzer 202 can be used to analyze frequencies of signals received by the receivers 104 and incrementally refine the sweep parameters used in successive sweeps.

Figure 3:
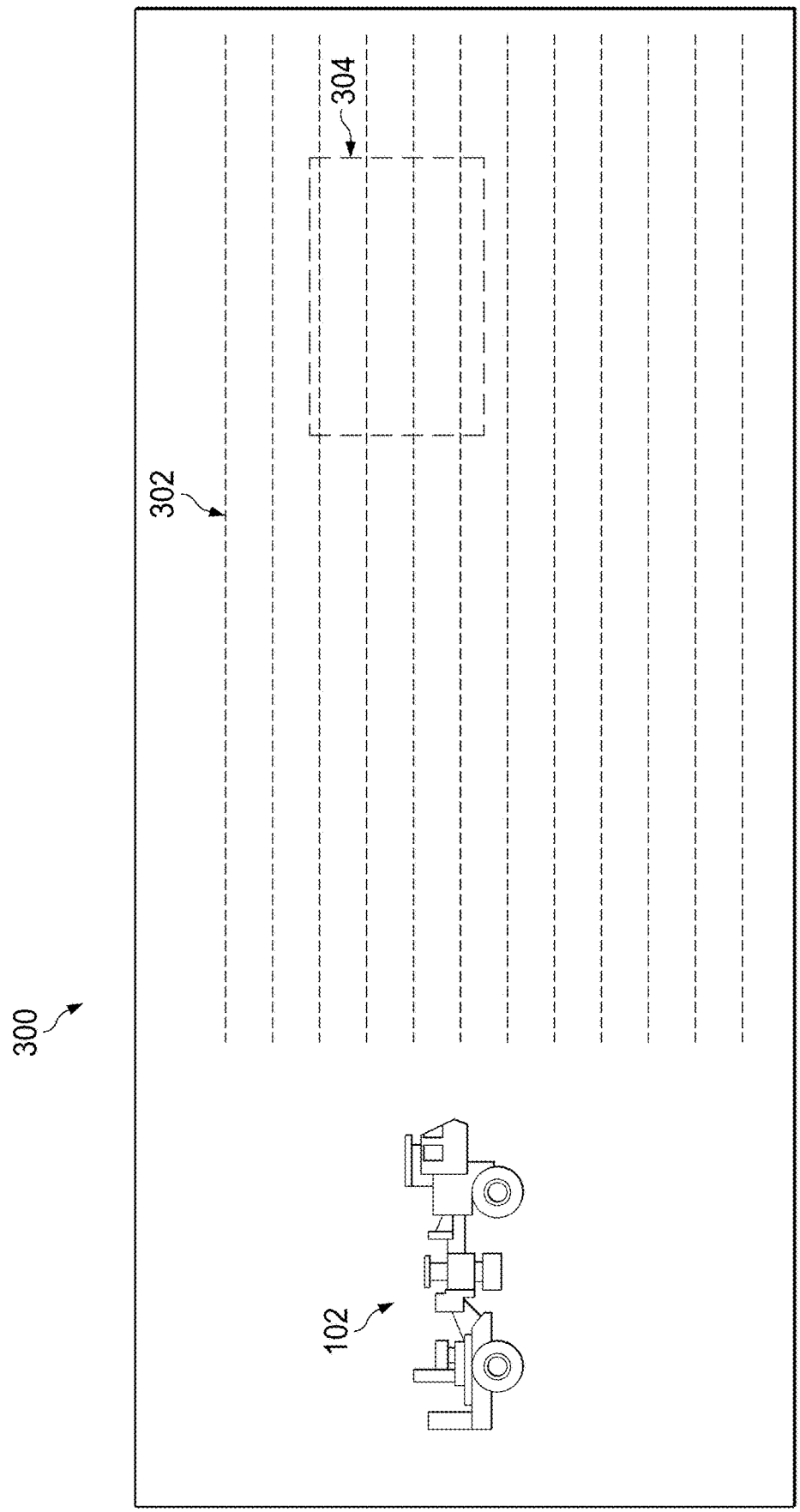
FIG. 3 is an aerial view of an example of a sweep area defining different components of a sweep, according to some implementations of the present disclosure.

FIG. 3 is an aerial view of an example of a recording area 300 defining different components of a sweep, according to some implementations of the present disclosure. For example, the recording area 300 includes receiver lines 302 that string together receivers 104 and source points from vibrator sources 102. Data transmission from the spatially-predefined selected patch 304 of receiver lines 302 can include an amplitude versus time signal of the summed receivers as shown in FIG. 4.

Figure 4:
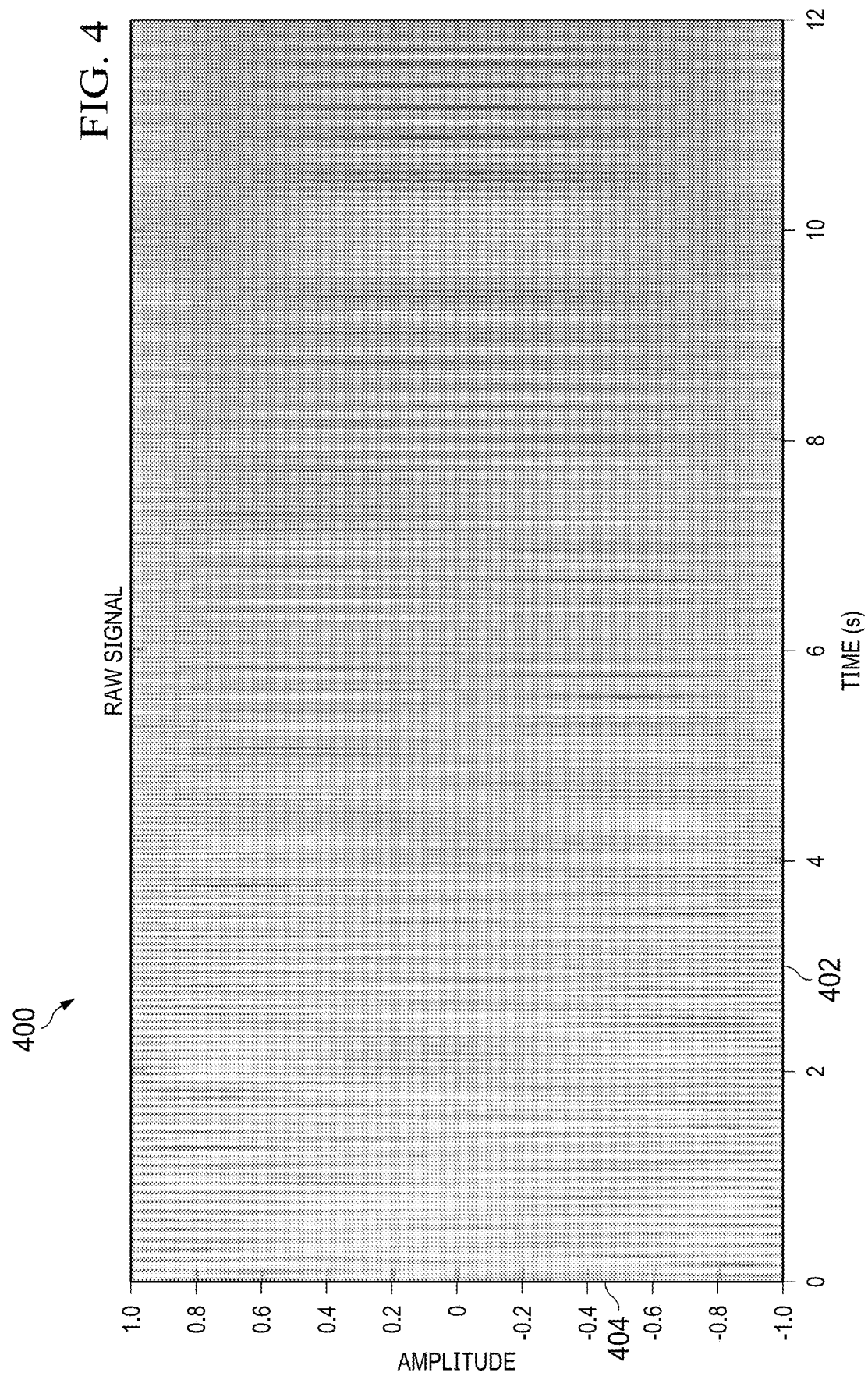
FIG. 4 is a diagram of an example of a raw pre-correlated recorded signal, according to some implementations of the present disclosure.

FIG. 4 is a diagram of an example of a raw pre-correlated recorded signal 400, according to some implementations of the present disclosure. For example, the raw pre-correlated recorded signal 400 can be the signal received from the selected patch 304. FIG. 4 shows the raw signal plotted relative to a time x-axis 402 (for example, in seconds) and an amplitude y-axis 404.

Figure 5:
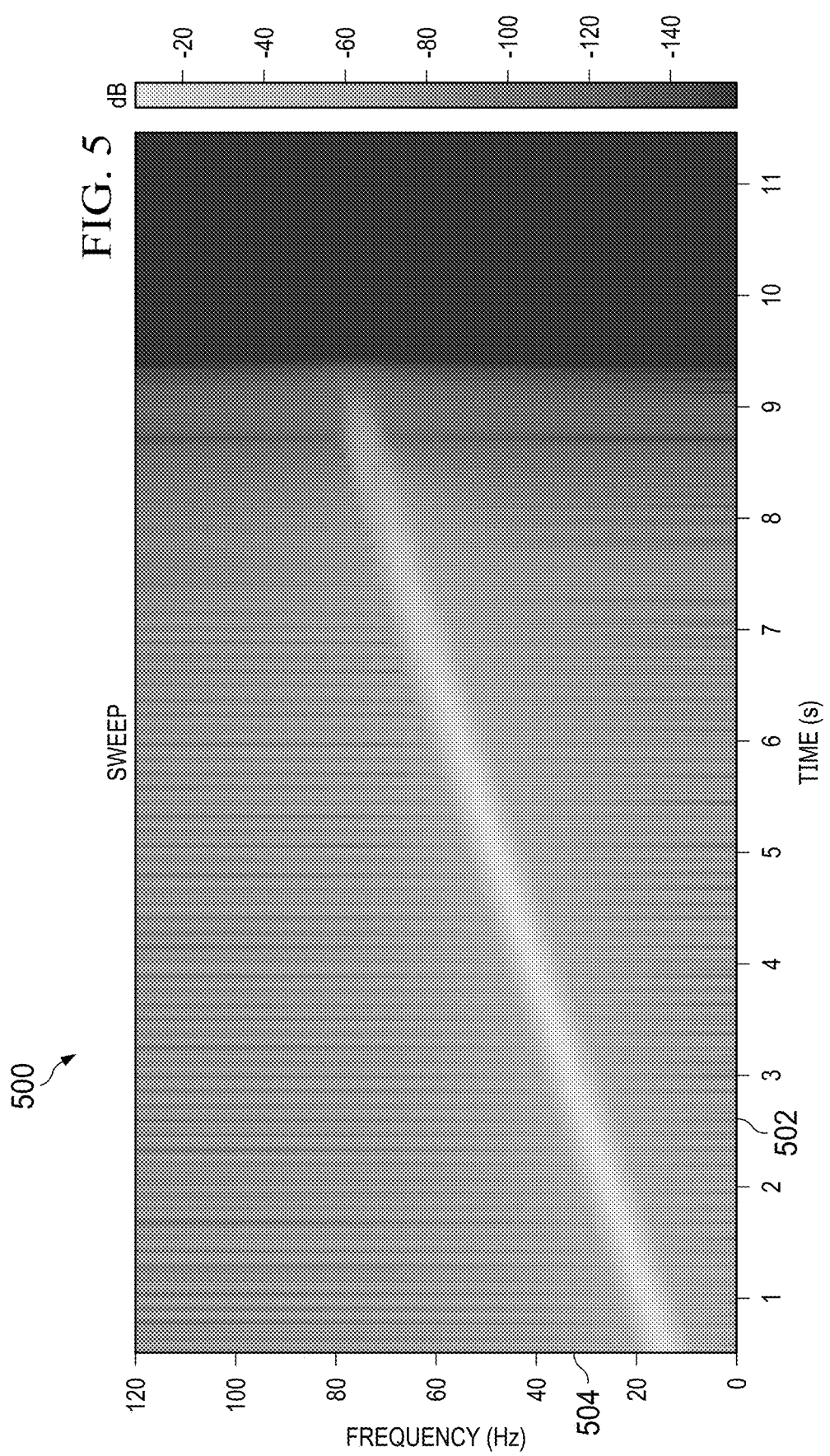
FIG. 5 is a diagram showing an example of a signal generated from an application of a time-dependent Fourier transform that is applied to the raw signal, according to some implementations of the present disclosure.

FIG. 5 is a diagram showing an example of a signal 500 generated from an application of a time-dependent Fourier transform that is applied to the raw single, according to some implementations of the present disclosure. For example, the time-dependent Fourier transform can be applied by the frequency analyzer 202. The signal 500 shows the minimum and a maximum frequencies that were transmitted through the Earth from which sweep parameters can be adjusted accordingly. For example, updating the sweep can depend on which signals are attenuated. A non-linear sweep can replace a typical linear sweep in order to tilt a signal spectrum upwards or downwards. In some implementations, a combination of the sweep parameters can be adjusted to compensate for a low signal-to-noise ratio. The signal 500 is plotted relative to a time x-axis 502 (for example, in seconds) and a frequency y-axis 504.

Figure 6:
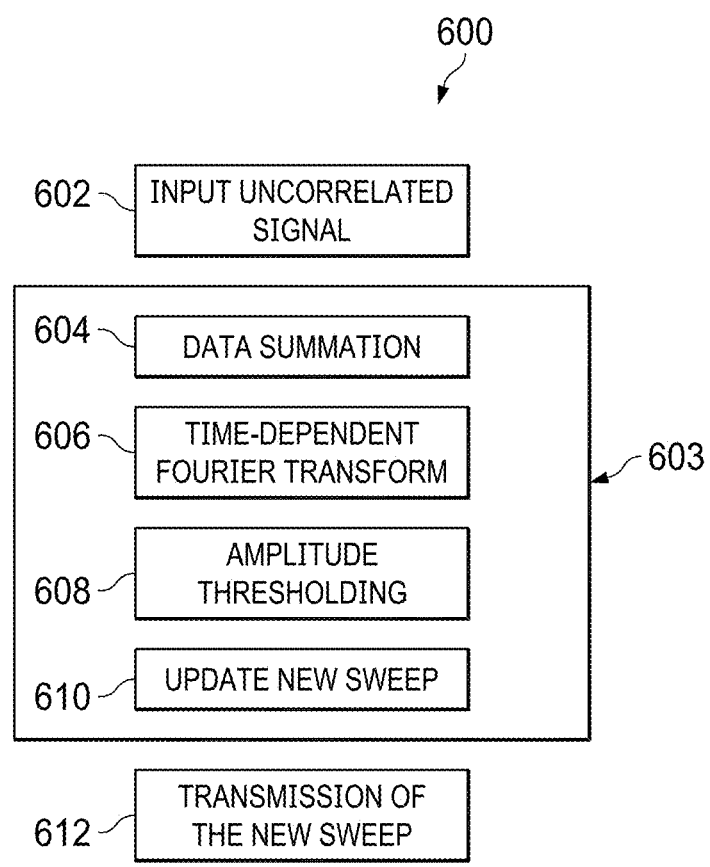
FIG. 6 is a flow diagram of an example of a workflow for updating sweep parameters and for performing another sweep, according to some implementations of the present disclosure.

FIG. 6 is a flow diagram of an example of a workflow 600 for updating sweep parameters and for performing another sweep, according to some implementations of the present disclosure. The workflow 600 can support time-distance signal acquisition using multiple vibratory sources 102. For example, the methodology represented by the workflow can run in parallel where more than one vibratory source 102 is emitting vibrations 106. The quality of output of the workflow 600 can be improved when separations are optimized for sufficient time versus distance to distinguish reflected events.

At 602, an uncorrelated signal is received. For example, the receivers 104 can receive a data transmission from the spatially-predefined receiver patch 304. An example of the amplitude versus time signal 400 that is received is shown in FIG. 4. The information can be provided to the frequency analyzer 202 which can begin analysis 603 of the signal.

At 604, data summation and normalization of the summed trace can occur on the received signal in order to increase the signal-to-noise ratio.

At 606, time-dependent Fourier transform is applied to the pre-correlated signal. For example, the frequency analyzer 202 can perform transformations, including a time-dependent Fourier transform, on the signals received from the receivers 104. An example of a signal generated from an application of a time-dependent Fourier transform that is applied to the raw signal is shown in FIG. 5.

At 608, amplitude thresholding is used to identify the new frequency limits with maximum energy. For example, the frequency analyzer 202 can determine which of the reflected seismic waves are attenuated using an integral transform and a thresholding algorithm for image segmentation.

At 610, design a new pilot sweep according to the new time—frequency characteristics. For example, the frequency analyzer 202 can generate a new set of sweep parameters. In some implementations, the sweep parameters can be updated in a way to prevent unexpected results that may occur when vibratory source signals are overlapping, causing contamination noise to affect the analysis of the data.

At 612, a transmission of the new sweep occurs. For example, one or more vibratory sources 102 can conduct another sweep using updated sweep parameters provided by the frequency analyzer 202.

Figure 7:
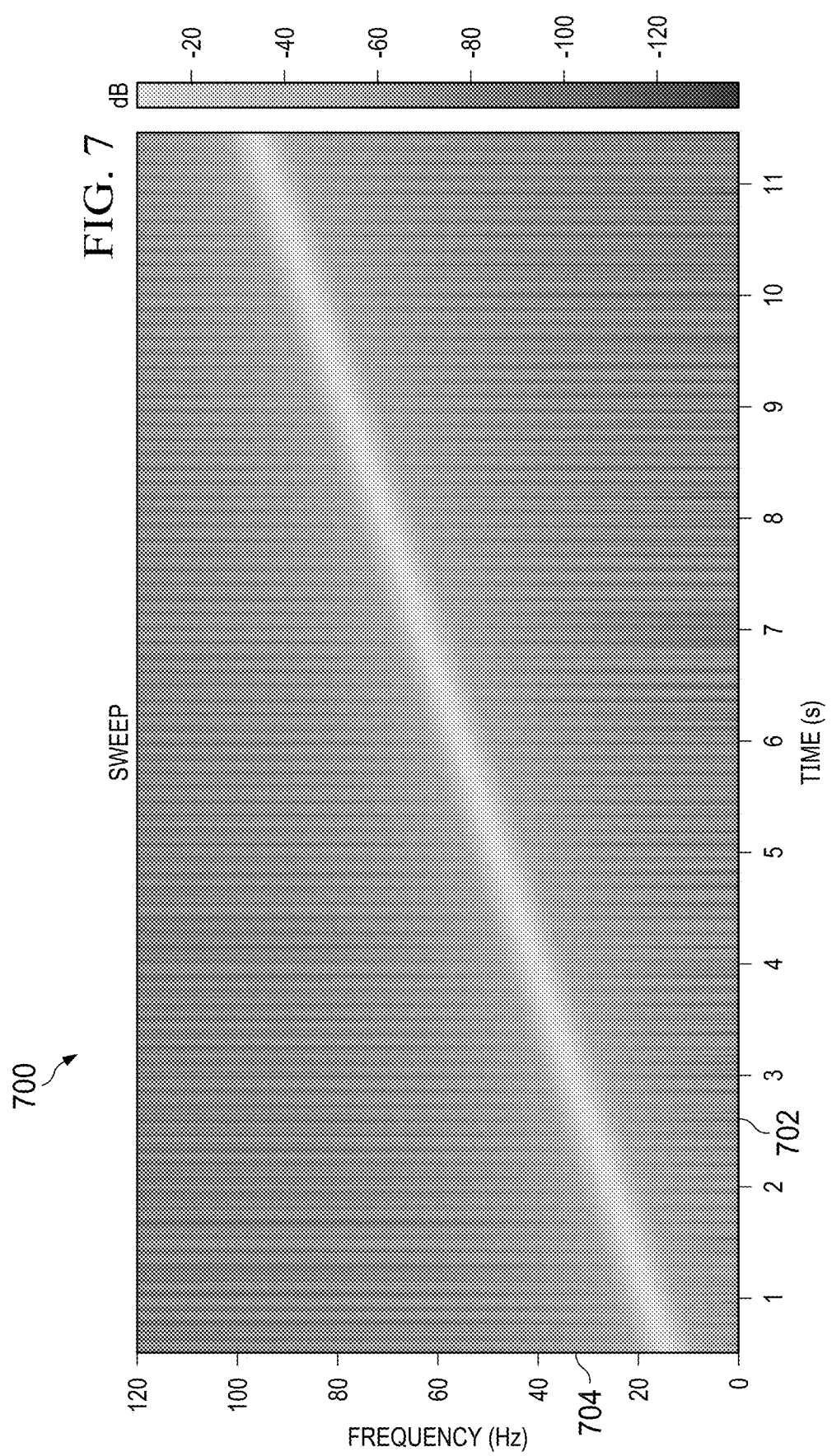
FIG. 7 is a graph showing an example of experimental results of a frequency signal at the vibratory source side, according to some implementations of the present disclosure.

FIG. 7 is a graph showing an example of experimental results of a frequency signal 700 at the vibratory source side, according to some implementations of the present disclosure. The results were generated from a numerical experiment demonstrating techniques used in the present disclosure. In the example shown in FIG. 7, a seismic sweep from 10-100 hertz (Hz) was generated, which is a typical sweep for land type acquisition. Using a time-dependent Fourier transform at the source side, a full spectrum was obtained. The frequency signal 700 are computed using a time-dependent Fourier transform of a simulated signal. The frequency signal 700 is plotted relative to a time x-axis 702 (for example, in seconds (s)) and a frequency y-axis 704. Color coding is used on the frequency signal 700 to indicate different decibel (dB) values for signals plotted relative to the time x-axis 702 and the frequency y-axis 704. The frequency signal 700 contains high frequencies, as compared to the signal 500 in which a high-frequency component is absent from the recorded signal.

Figure 8:
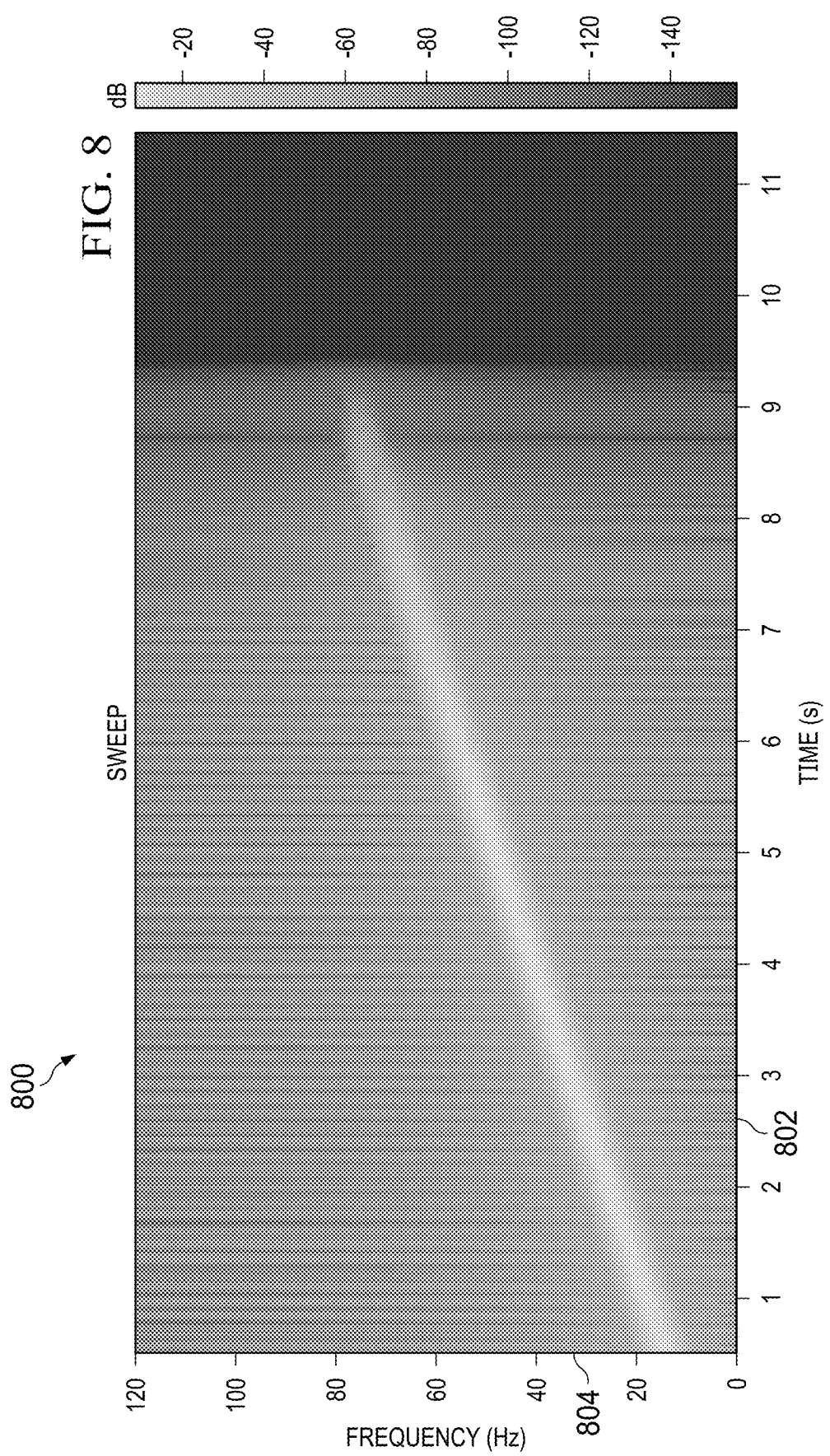
FIG. 8 is a drawing of an example of a time-dependent Fourier transform plot of an attenuated signal received at the receiver, according to some implementations of the present disclosure.

FIG. 8 is a drawing of an example of a time-dependent Fourier transform plot 800 of an attenuated signal received at the receiver 104, according to some implementations of the present disclosure. In some implementations, the plot 800 can be produced using information received from an array of receivers 104. In the frequency-to-time plot 800, the higher frequencies are attenuated due to absorption. The signal in plot 800 is plotted relative to a time x-axis 802 (for example, in seconds) and a frequency y-axis 804. Color coding is used on the time-dependent Fourier transform plot 800 to indicate different decibel (dB) values for signals plotted relative to the time x-axis 802 and the frequency y-axis 804.

Figure 9:
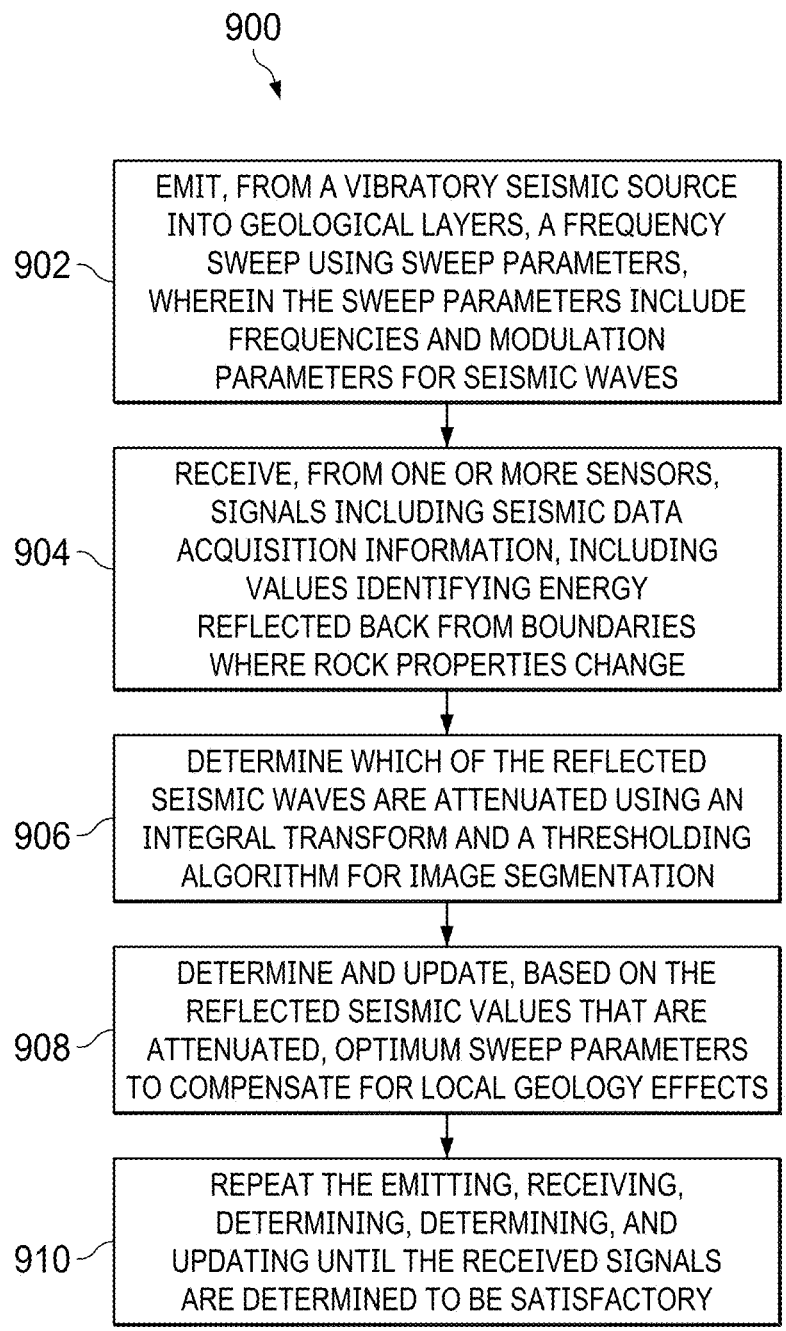
FIG. 9 is a flowchart of an example method for sweep parameters based on location-based geological conditions, according to some implementations of the present disclosure.

FIG. 9 is a flowchart of an example method 900 for sweep parameters based on location-based geological conditions, according to some implementations of the present disclosure. For clarity of presentation, the description that follows generally describes method 900 in the context of the other figures in this description. However, it will be understood that method 900 may be performed, for example, by any suitable system, environment, software, and hardware, or a combination of systems, environments, software, and hardware, as appropriate. In some implementations, various steps of method 900 can be run in parallel, in combination, in loops, or in any order.

At 902, a frequency sweep using sweep parameters is emitted from a vibratory seismic source into geological layers. The sweep parameters include frequencies and modulation parameters for seismic waves. For example, the vibratory source 102 can emit vibrations 106 during a frequency sweep (or a pilot sweep) for a limited amount of time, for example, for 12 to 16 seconds. From 902, method 900 proceeds to 904.

At 904, signals are received from one or more sensors. The signals include seismic data acquisition information, including values identifying energy reflected back from boundaries where rock properties change. For example, the multiple receivers 104 can receive and record elastic waves 108 that have been reflected by the subsurface geologic layers 110. Sensors, such as the multiple receivers 104, can include surface and underground sensors. From 904, method 900 proceeds to 906.

At 906, a determination is made as to which of the reflected seismic waves are attenuated using an integral transform and a thresholding algorithm for image segmentation. For example, the frequency analyzer 202 can determine which of the reflected seismic waves are attenuated using an integral transform and a thresholding algorithm for image segmentation. The integral transform performed by the frequency analyzer 202 can be, for example, a time-dependent Fourier transformation. From 906, method 900 proceeds to 908.

At 908, optimum sweep parameters are determined and updated to compensate for local geology effects. The updating is based on the reflected seismic values that are attenuated. As an example, the frequency analyzer 202 can updated the sweep parameters based on the analysis of the attenuation of the reflected seismic waves and by using the thresholding algorithm for image segmentation. The local geology effects for which compensation occurs can include, for example, absorption of high-frequency signals (for example, above 100-120 Hz). From 908, method 900 proceeds to 910.

At 910, the emitting, receiving, determining attenuation, determining optimum parameters, and updating are repeated until the received signals are determined to be satisfactory. For example, geologists or other on-site personnel at the land data acquisition operation 200 can elect to perform additional sweeps, each using incrementally updated sweep parameters based on a previous sweep. The repeating the emitting, receiving, determining, and updating can occur within a predefined period of time, such as automatically in near real-time, or within minutes, for example. In some implementations, geologists or other personnel can make their decisions based on information displayed in a user interface that is communicatively coupled to the frequency analyzer 202 and optionally to remote sources. Information presented to a user can include, for example, an amount (for example, percentage) of change in signals between successive sweeps. After 910, method 900 stops.

Figure 10:
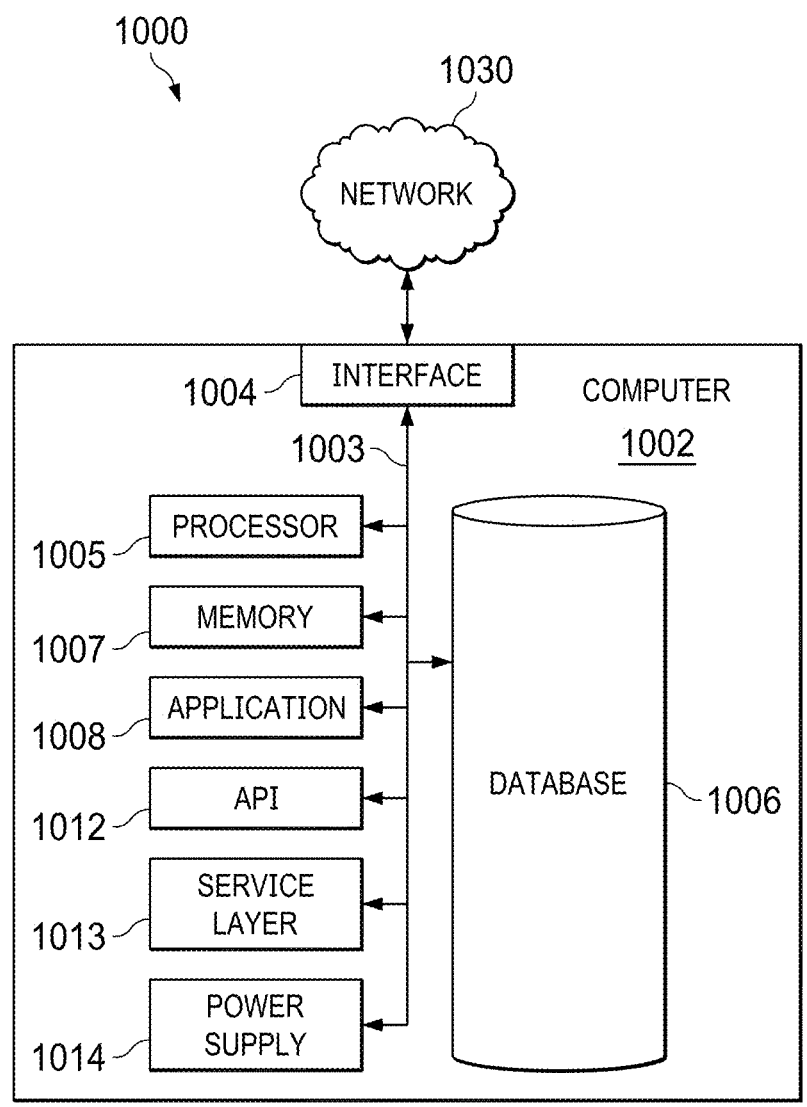
FIG. 10 is a block diagram illustrating an example computer system used to provide computational functionalities associated with described algorithms, methods, functions, processes, flows, and procedures as described in the instant disclosure, according to some implementations of the present disclosure.

FIG. 10 is a block diagram of an example computer system 1000 used to provide computational functionalities associated with described algorithms, methods, functions, processes, flows, and procedures, as described in the instant disclosure, according to some implementations of the present disclosure. The illustrated computer 1002 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1002 may comprise a computer that includes an input device, such as a keypad, keyboard, or touch screen that can accept user information, and an output device that conveys information associated with the operation of the computer 1002, including digital data, visual, or audio information (or a combination of information), or a graphical-type user interface (UI) (or GUI).

The computer 1002 can serve in a role as a client, network component, a server, a database or other persistency, or any other component (or a combination of roles) of a computer system for performing the subject matter described in the instant disclosure. The illustrated computer 1002 is communicably coupled with a network 1030. In some implementations, one or more components of the computer 1002 may be configured to operate within environments, including cloud-computing-based, local, global, or a combination of environments.

At a high level, the computer 1002 is an electronic computing device operable to receive, transmit, process, store, or manage data and information associated with the described subject matter. According to some implementations, the computer 1002 may also include or be communicably coupled with an application server, email server, web server, caching server, streaming data server, or a combination of servers.

The computer 1002 can receive requests over network 1030 from a client application (for example, executing on another computer 1002) and respond to the received requests by processing the received requests using an appropriate software application(s). In addition, requests may also be sent to the computer 1002 from internal users (for example, from a command console or by other appropriate access method), external or third-parties, other automated applications, as well as any other appropriate entities, individuals, systems, or computers.

Each of the components of the computer 1002 can communicate using a system bus 1003. In some implementations, any or all of the components of the computer 1002, hardware or software (or a combination of both hardware and software), may interface with each other or the interface 1004 (or a combination of both), over the system bus 1003 using an application programming interface (API) 1012 or a service layer 1013 (or a combination of the API 1012 and service layer 1013). The API 1012 may include specifications for routines, data structures, and object classes. The API 1012 may be either computer-language independent or dependent and refer to a complete interface, a single function, or even a set of APIs. The service layer 1013 provides software services to the computer 1002 or other components (whether or not illustrated) that are communicably coupled to the computer 1002. The functionality of the computer 1002 may be accessible for all service consumers using this service layer. Software services, such as those provided by the service layer 1013, provide reusable, defined functionalities through a defined interface. For example, the interface may be software written in JAVA, C++, or other language providing data in extensible markup language (XML) format or other format. While illustrated as an integrated component of the computer 1002, alternative implementations may illustrate the API 1012 or the service layer 1013 as stand-alone components in relation to other components of the computer 1002 or other components (whether or not illustrated) that are communicably coupled to the computer 1002. Moreover, any or all parts of the API 1012 or the service layer 1013 may be implemented as child or sub-modules of another software module, enterprise application, or hardware module without departing from the scope of this disclosure.

The computer 1002 includes an interface 1004. Although illustrated as a single interface 1004 in FIG. 10, two or more interfaces 1004 may be used according to particular needs, desires, or particular implementations of the computer 1002. The interface 1004 is used by the computer 1002 for communicating with other systems that are connected to the network 1030 (whether illustrated or not) in a distributed environment. Generally, the interface 1004 comprises logic encoded in software or hardware (or a combination of software and hardware) and is operable to communicate with the network 1030. More specifically, the interface 1004 may comprise software supporting one or more communication protocols associated with communications such that the network 1030 or interface's hardware is operable to communicate physical signals within and outside of the illustrated computer 1002.

The computer 1002 includes a processor 1005. Although illustrated as a single processor 1005 in FIG. 10, two or more processors may be used according to particular needs, desires, or particular implementations of the computer 1002. Generally, the processor 1005 executes instructions and manipulates data to perform the operations of the computer 1002 and any algorithms, methods, functions, processes, flows, and procedures as described in the instant disclosure.

The computer 1002 also includes a database 1006 that can hold data for the computer 1002 or other components (or a combination of both) that can be connected to the network 1030 (whether illustrated or not). For example, database 1006 can be an in-memory database or a conventional database. In some implementations, database 1006 can be a combination of two or more different database types (for example, a hybrid in-memory and conventional database) according to particular needs, desires, or particular implementations of the computer 1002 and the described functionality. Although illustrated as a single database 1006 in FIG. 10, two or more databases (of the same or combination of types) can be used according to particular needs, desires, or particular implementations of the computer 1002 and the described functionality. While database 1006 is illustrated as an integral component of the computer 1002, in alternative implementations, database 1006 can be external to the computer 1002.

The computer 1002 also includes a memory 1007 that can hold data for the computer 1002 or other components (or a combination of both) that can be connected to the network 1030 (whether illustrated or not). Memory 1007 can store any data consistent with this disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same or combination of types) can be used according to particular needs, desires, or particular implementations of the computer 1002 and the described functionality. While memory 1007 is illustrated as an integral component of the computer 1002, in alternative implementations, memory 1007 can be external to the computer 1002.

The application 1008 is an algorithmic software engine providing functionality according to particular needs, desires, or particular implementations of the computer 1002, particularly with respect to functionality described in this disclosure. For example, application 1008 can serve as one or more components, modules, or applications. Further, although illustrated as a single application 1008, the application 1008 may be implemented as multiple applications 1008 on the computer 1002. In addition, although illustrated as integral to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion or management circuits (including recharging, standby, or other power management functionality). In some implementations, the power-supply 1014 can include a power plug to allow the computer 1002 to be plugged into a wall socket or other power source to, for example, power the computer 1002 or recharge a rechargeable battery.

There may be any number of computers 1002 associated with, or external to, a computer system containing computer 1002, each computer 1002 communicating over network 1030. Further, the term "client," "user," and other appropriate terminology may be used interchangeably, as appropriate, without departing from the scope of this disclosure. Moreover, this disclosure contemplates that many users may use one computer 1002, or that one user may use multiple computers 1002.

Described implementations of the subject matter can include one or more features, alone or in combination.

For example, in a first implementation, a computer-implemented method, comprising: emitting, from a vibratory seismic source into geological layers, a frequency sweep using sweep parameters, wherein the sweep parameters include frequencies and modulation parameters for seismic waves; receiving, from one or more sensors, signals including seismic data acquisition information, including values identifying energy reflected back from boundaries where rock properties change; determining which of the reflected seismic waves are attenuated using an integral transform and a thresholding algorithm for image segmentation; determining and updating, based on the reflected seismic values that are attenuated, optimum sweep parameters to compensate for local geology effects; and repeating the emitting, receiving, determining attenuation, determining optimum parameters, and updating until the received signals are determined to be satisfactory.

The foregoing and other described implementations can each, optionally, include one or more of the following features:

A first feature, combinable with any of the following features, wherein the integral transform is a time-dependent Fourier transformation.

A second feature, combinable with any of the previous or following features, wherein the local geology effects include absorption of high-frequency signals.

A third feature, combinable with any of the previous or following features, wherein the sweep parameters include a sweep duration, a total time for all sweeps, a sweep start time, a sweep stop time, a sweep start frequency, a sweep stop frequency, a sweep as a function of amplitude and time, a sweep phase encoding, a vibrator hold-down force, a number of sweep segments, pre- and post-sweep tapers and duration, and a sweep listen time between sweeps.

A fourth feature, combinable with any of the previous or following features, wherein repeating the emitting, receiving, determining, and updating occurs within a predefined period of time.

A fifth feature, combinable with any of the previous or following features, wherein the sensors include underground sensors and surface sensors.

A sixth feature, combinable with any of the previous or following features, wherein the thresholding algorithm includes amplitude thresholding applied to identify frequencies having a sufficient signal-to-noise ratio.

A seventh feature, combinable with any of the previous or following features, wherein the signals include elastic waves reflected by subsurface geologic layers.

In a second implementation, a non-transitory, computer-readable medium storing one or more instructions executable by a computer system to perform operations comprising: emitting, from a vibratory seismic source into geological layers, a frequency sweep using sweep parameters, wherein the sweep parameters include frequencies and modulation parameters for seismic waves; receiving, from one or more sensors, signals including seismic data acquisition information, including values identifying energy reflected back from boundaries where rock properties change; determining which of the reflected seismic waves are attenuated using an integral transform and a thresholding algorithm for image segmentation; determining and updating, based on the reflected seismic values that are attenuated, optimum sweep parameters to compensate for local geology effects; and repeating the emitting, receiving, determining attenuation, determining optimum parameters, and updating until the received signals are determined to be satisfactory.

The foregoing and other described implementations can each, optionally, include one or more of the following features:

A first feature, combinable with any of the following features, wherein the integral transform is a time-dependent Fourier transformation.

A second feature, combinable with any of the previous or following features, wherein the local geology effects include absorption of high-frequency signals.

A third feature, combinable with any of the previous or following features, wherein the sweep parameters include a sweep duration, a total time for all sweeps, a sweep start time, a sweep stop time, a sweep start frequency, a sweep stop frequency, a sweep as a function of amplitude and time, a sweep phase encoding, a vibrator hold-down force, a number of sweep segments, pre- and post-sweep tapers and duration, and a sweep listen time between sweeps.

A fourth feature, combinable with any of the previous or following features, wherein repeating the emitting, receiving, determining, and updating occurs within a predefined period of time.

A fifth feature, combinable with any of the previous or following features, wherein the sensors include underground sensors and surface sensors.

A sixth feature, combinable with any of the previous or following features, wherein the thresholding algorithm includes amplitude thresholding applied to identify frequencies having a sufficient signal-to-noise ratio.

A seventh feature, combinable with any of the previous or following features, wherein the signals include elastic waves reflected by subsurface geologic layers.

In a third implementation, a computer-implemented system, comprising: one or more processors; and a non-transitory computer-readable storage medium coupled to the one or more processors and storing programming instructions for execution by the one or more processors, the programming instructions instruct the one or more processors to: emitting, from a vibratory seismic source into geological layers, a frequency sweep using sweep parameters, wherein the sweep parameters include frequencies and modulation parameters for seismic waves; receiving, from one or more sensors, signals including seismic data acquisition information, including values identifying energy reflected back from boundaries where rock properties change; determining which of the reflected seismic waves are attenuated using an integral transform and a thresholding algorithm for image segmentation; determining and updating, based on the reflected seismic values that are attenuated, optimum sweep parameters to compensate for local geology effects; and repeating the emitting, receiving, determining attenuation, determining optimum parameters, and updating until the received signals are determined to be satisfactory.

The foregoing and other described implementations can each, optionally, include one or more of the following features:

A first feature, combinable with any of the following features, wherein the integral transform is a time-dependent Fourier transformation.

A second feature, combinable with any of the previous or following features, wherein the local geology effects include absorption of high-frequency signals.

A third feature, combinable with any of the previous or following features, wherein the sweep parameters include a sweep duration, a total time for all sweeps, a sweep start time, a sweep stop time, a sweep start frequency, a sweep stop frequency, a sweep as a function of amplitude and time, a sweep phase encoding, a vibrator hold-down force, a number of sweep segments, pre- and post-sweep tapers and duration, and a sweep listen time between sweeps.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, or subroutine. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/–R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references to the various objects. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light-emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or a combination of communication types between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in the present disclosure can be any file system type accessible from multiple servers for read and update. Locking or consistency tracking is not necessary since the locking of exchange file system can be done at application layer. Furthermore, Unicode data files are different from non-Unicode data files.

While this specification contains many specific implementation details, these should not be construed as limitations on the scope of the present disclosure or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   emitting, from a vibratory seismic source into geological layers, a frequency sweep using sweep parameters, wherein the sweep parameters include frequencies and modulation parameters for seismic waves;
   receiving, from one or more sensors, signals including seismic data acquisition information, including values identifying energy reflected back from boundaries where rock properties change;
   determining which of the reflected seismic waves are attenuated using an integral transform and a thresholding algorithm for image segmentation;
   determining and updating, based on the reflected seismic values that are attenuated, optimum sweep parameters to compensate for local geology effects; and
   repeating the emitting, receiving, determining attenuation, determining optimum sweep parameters, and updating until the received signals, when displayed to on-site personnel with a percentage of change in signals between successive sweeps, are accepted by the on-site personnel.

2. The computer-implemented method of claim 1, wherein the integral transform is a time-dependent Fourier transformation.

3. The computer-implemented method of claim 1, wherein the local geology effects include absorption of high-frequency signals.

4. The computer-implemented method of claim 1, wherein the sweep parameters include a sweep duration, a total time for all sweeps, a sweep start time, a sweep stop time, a sweep start frequency, a sweep stop frequency, a sweep as a function of amplitude and time, a sweep phase encoding, a vibrator hold-down force, a number of sweep segments, pre- and post-sweep tapers and duration, and a sweep listen time between sweeps.

5. The computer-implemented method of claim 1, wherein repeating the emitting, receiving, determining, and updating occurs within a predefined period of time.

6. The computer-implemented method of claim 1, wherein the sensors include underground sensors and surface sensors.

7. The computer-implemented method of claim 1, wherein the thresholding algorithm includes amplitude thresholding applied to identify frequencies having a sufficient signal-to-noise ratio.

8. The computer-implemented method of claim 1, wherein the signals include elastic waves reflected by subsurface geologic layers.

9. A non-transitory, computer-readable medium storing one or more instructions executable by a computer system to perform operations comprising:
   emitting, from a vibratory seismic source into geological layers, a frequency sweep using sweep parameters, wherein the sweep parameters include frequencies and modulation parameters for seismic waves;
   receiving, from one or more sensors, signals including seismic data acquisition information, including values identifying energy reflected back from boundaries where rock properties change;
   determining and updating, based on the reflected seismic values that are attenuated, optimum sweep parameters to compensate for local geology effects; and
   repeating the emitting, receiving, determining attenuation, determining optimum sweep parameters, and updating until the received signals, when displayed to on-site personnel with a percentage of change in signals between successive sweeps, are accepted by the on-site personnel.

10. The non-transitory, computer-readable medium of claim 9, wherein the integral transform is a time-dependent Fourier transformation.

11. The non-transitory, computer-readable medium of claim 9, wherein the local geology effects include absorption of high-frequency signals.

12. The computer-implemented method of claim 1, wherein the sweep parameters include a sweep duration, a total time for all sweeps, a sweep start time, a sweep stop time, a sweep start frequency, a sweep stop frequency, a sweep as a function of amplitude and time, a sweep phase encoding, a vibrator hold-down force, a number of sweep segments, pre- and post-sweep tapers and duration, and a sweep listen time between sweeps.

13. The non-transitory, computer-readable medium of claim 9, wherein repeating the emitting, receiving, determining, and updating occurs within a predefined period of time.

14. The non-transitory, computer-readable medium of claim 9, wherein the sensors include underground sensors and surface sensors.

15. The non-transitory, computer-readable medium of claim 9, wherein the thresholding algorithm includes amplitude thresholding applied to identify frequencies having a sufficient signal-to-noise ratio.

16. The non-transitory, computer-readable medium of claim 9, wherein the signals include elastic waves reflected by subsurface geologic layers.

17. A computer-implemented system, comprising:
one or more processors; and
a non-transitory computer-readable storage medium coupled to the one or more processors and storing programming instructions for execution by the one or more processors, the programming instructions instruct the one or more processors to perform operations comprising:
emitting, from a vibratory seismic source into geological layers, a frequency sweep using sweep parameters, wherein the sweep parameters include frequencies and modulation parameters for seismic waves;
receiving, from one or more sensors, signals including seismic data acquisition information, including values identifying energy reflected back from boundaries where rock properties change;
determining which of the reflected seismic waves are attenuated using an integral transform and a thresholding algorithm for image segmentation;
determining and updating, based on the reflected seismic values that are attenuated, optimum sweep parameters to compensate for local geology effects; and
repeating the emitting, receiving, determining attenuation, determining optimum sweep parameters, and updating until the received signals, when displayed to on-site personnel with a percentage of change in signals between successive sweeps, are accepted by the on-site personnel.

18. The computer-implemented system of claim 17, wherein the integral transform is a time-dependent Fourier transformation.

19. The computer-implemented system of claim 17, wherein the local geology effects include absorption of high-frequency signals.

20. The computer-implemented method of claim 1, wherein the sweep parameters include a sweep duration, a total time for all sweeps, a sweep start time, a sweep stop time, a sweep start frequency, a sweep stop frequency, a sweep as a function of amplitude and time, a sweep phase encoding, a vibrator hold-down force, a number of sweep segments, pre- and post-sweep tapers and duration, and a sweep listen time between sweeps.

* * * * *